United States Patent [19]

Adsett

[11] Patent Number: 4,714,107

[45] Date of Patent: Dec. 22, 1987

[54] TITANIUM HEAT EXCHANGER FOR LASER COOLING

[75] Inventor: Anthony P. Adsett, Orlando, Fla.

[73] Assignee: International Laser Systems, Inc., Orlando, Fla.

[21] Appl. No.: 240,774

[22] Filed: Mar. 5, 1981

[51] Int. Cl.$^4$ .............................................. B28D 7/02
[52] U.S. Cl. .................................. 165/16 A; 165/76; 165/170; 165/905
[58] Field of Search ......................... 165/164–166, 165/170, 179, 185; 228/263 V, 263 G, 188, 208, 210; 372/35

[56] References Cited

U.S. PATENT DOCUMENTS

| | | | |
|---|---|---|---|
| 2,529,013 | 11/1950 | Gloyer | 165/166 |
| 2,719,354 | 10/1955 | Dalin | 165/185 |
| 2,722,048 | 11/1955 | Gier, Jr. | 228/183 |
| 3,533,153 | 10/1970 | Mellill et al. | 228/263 J |
| 3,800,868 | 4/1974 | Berkowitz et al. | 165/170 |
| 4,033,407 | 7/1977 | Quintilliano | 165/1 X |
| 4,197,512 | 4/1980 | Brenac | 372/35 |
| 4,222,434 | 9/1980 | Clyde | 165/166 X |
| 4,287,945 | 9/1981 | Hessari | 165/167 |

FOREIGN PATENT DOCUMENTS 1913988 10/1970 Fed. Rep. of Germany ... 228/263 G

*Primary Examiner*—William R. Cline
*Attorney, Agent, or Firm*—William M. Hobby, III

[57] ABSTRACT

A heat exchanger apparatus has a titanium liquid circuit for the passage of a liquid to be cooled. The liquid circuit has a liquid input and a liquid output and is formed with titanium walls having coacting ribs formed on two walls to spread the liquid passing therethrough. A pair of cooling circuits located adjacent to the liquid circuit has air or another cooling fluid passed therethrough for cooling the liquid passing through the liquid circuit. Each cooling circuit is attached adjacent one titanium wall of the liquid circuit and each has a purality of metallic cooling fins, such as pin fins, fixedly soldered or brazed to the titanium wall. The titanium liquid side has no brazed or soldered joint and this prevents corrosion and contamination, while the heat exchanger efficiency is enhanced by the thin walls of titanium having high heat transfer pin fins soldered or brazed directly to the air side. Complete access to the liquid side of the heat exchanger is provided for cleaning.

31 Claims, 9 Drawing Figures

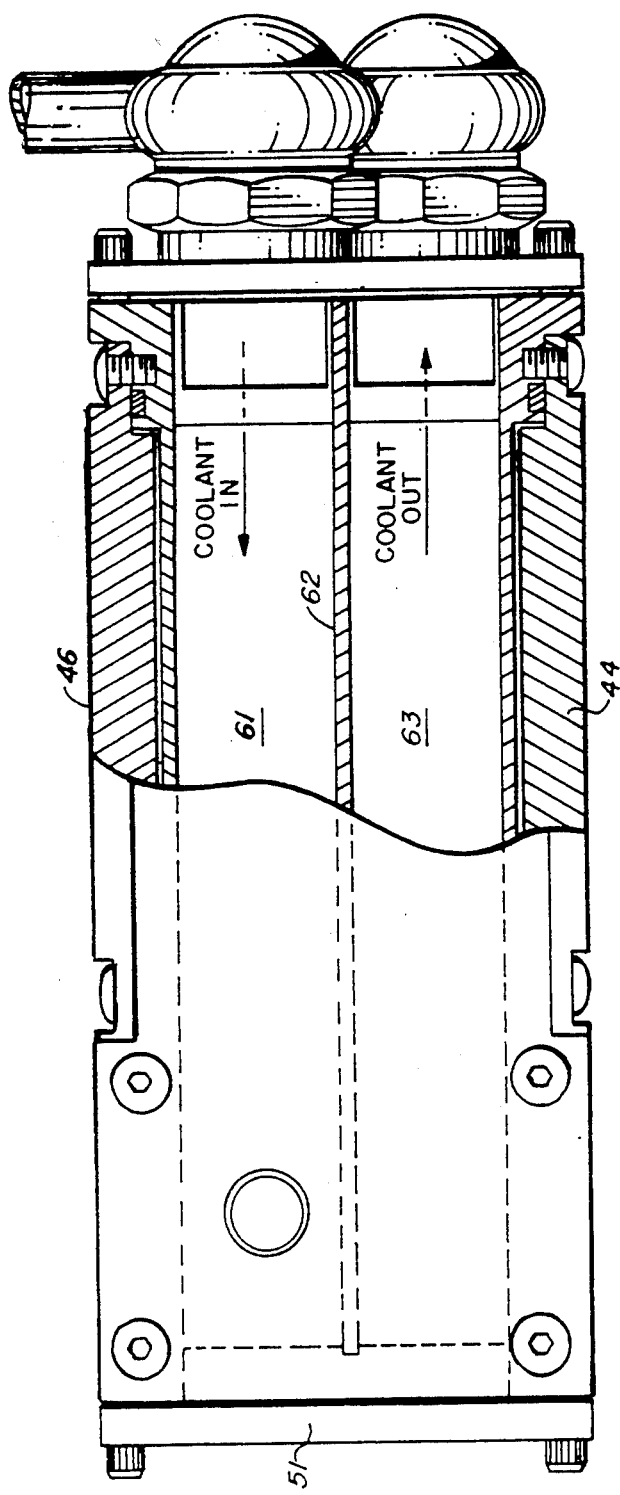
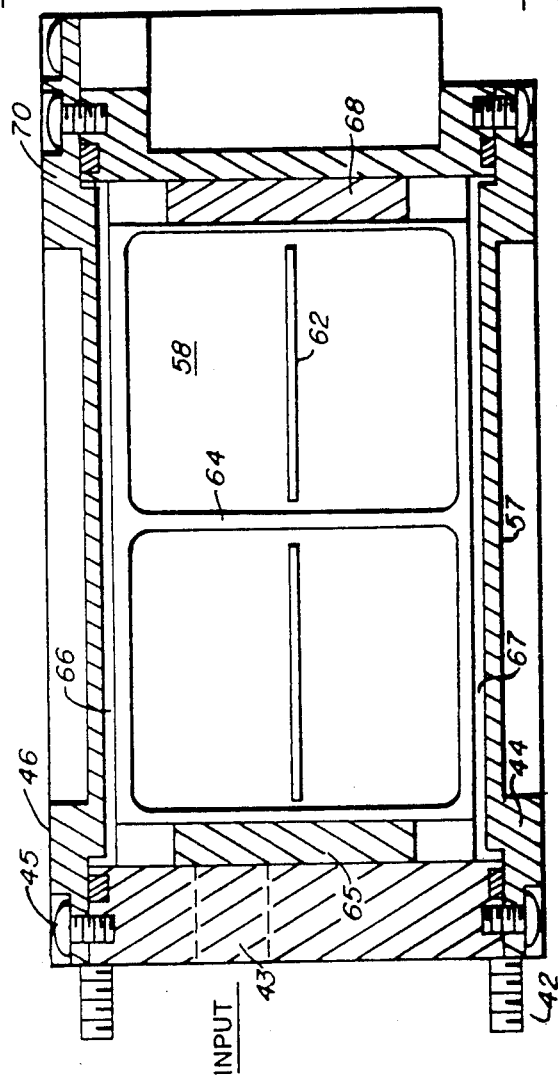

TITANIUM HEAT EXCHANGER FOR LASER COOLING

BACKGROUND OF THE INVENTION

The present invention relates to heat exchangers, and especially to small, compact, efficient heat exchangers such as what might be used in cooling lasers.

In the past, it has been common to cool high energy lasers and similar optical or scientific equipment using small efficient heat exchangers which are light in weight and will not interfere with the operation of the laser. One of the most common heat exchangers used in lasers utilizes an aluminum plate fin design, which because of the use of aluminum has a high heat transfer and light weight. Typical heat exchangers utilize liquid and air with the coolant being an ethylene-glycol or similar liquid which is efficient at removing heat from the laser and which is cooled with air passing over cooling fins in the heat exchanger. Because of the high heat transfer of an aluminum heat exchanger design, the heat exchanger experiences a low air pressure drop but can result in potentially severe contamination problems as a result of the ethylene-glycol action on the bare aluminum. Because of the potential contamination, it has been suggested to use stainless steel heat exchangers utilizing plate fins and this design results in a slightly less heat transfer effectiveness than when utilizing aluminum, but substantially increases the weight of the heat exchanger and has potentially severe contamination problems with rust and corrosion at welded and brazed joints. As a result of these problems, Applicant encountered with aluminum and stainless steel plate fin designs, a program was initiated to determine whether a titanium heat exchanger would solve the contamination problems; and at first proved unsuccessful because of the reduced heat transfer through the titanium as compared to the aluminum or stainless steel heat exchangers. A new titanium heat exchanger development program, however, has resulted in a titanium pin fin heat exchanger which utilizes titanium without welded or brazed connections in the liquid side of the heat exchanger, which prevents contamination of the coolant, and which utilizes other metals more efficient at removing heat. The heat exchanger uses thin walls of titanium and is free of contamination of the cooling liquid and is lighter than a stainless steel unit, even though heavier than aluminum. It is accordingly an aim of the present invention to provide a titanium heat exchanger which overcomes inherent limitations of heat transfer through titanium.

SUMMARY OF THE INVENTION

The present invention relates to heat exchangers, and especially to small, lightweight, efficient heat exchangers for use with lasers or other scientific, optical, or measuring devices. The heat exchanger has a liquid circuit or side for the passage of the coolant liquid therethrough from an input to an output for cooling the heated liquid passing therethrough. The liquid circuit is formed with titanium walls and passageways and includes coacting ribs formed over two thin walls of titanium. The coacting ribs are elongated protruding ribs which when assembled, protrude between the ribs on the opposite walls. A first fluid circuit allows for the passage of air therethrough for cooling a liquid passing through the liquid circuit and is attached adjacent to one of the thin titanium walls of the liquid circuit, but on the opposite side thereof and has a plurality of metallic cooling pins soldered or brazed to the thin titanium wall. The pins may be made of a metal other than titanium, having a high heat transfer, such as copper, and may be coated to prevent corrosion. A second fluid circuit is identical to the first and is attached adjacent a second thin wall of the liquid circuit, and has pin fins attached in a similar manner. The titanium liquid circuit is formed from a pair of solid titanium sides which are attached together utilizing an O-ring seal to form the liquid circuit without the use of soldered, brazed or welded joints, and allows access to the liquid side of the heat exchanger for cleaning the heat exchanger.

BRIEF DESCRIPTION OF THE DRAWINGS

Other objects, features and advantages of the present invention will be apparent from the written description and the drawings, in which:

FIG. 2 is an exploded view of the heat exchanger of FIG. 1;

FIG. 8 is a partial side sectional view of the heat exchanger of FIGS. 6 and 7; and FIG. 9 is a side sectional view of the heat exchanger of FIGS. 6, 7 and 8.

DESCRIPTION OF THE PREFERRED EMBODIMENTS

Figure 1:
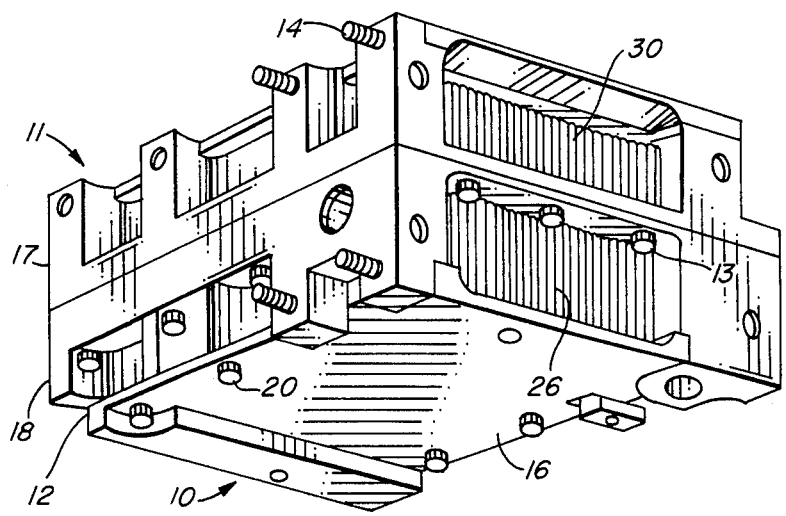
FIG. 1 is a bottom perspective view of a heat exchanger in accordance with the present invention.

Referring to FIGS. 1 through 5 of the drawings, a heat exchanger 10 in accordance with the present invention is shown assembled in FIG. 1 and has an upper assembly 11 and a lower assembly 12, which are bolted together with bolts 13 and has mounting bolts 14 formed in top assembly 11 and bottom assembly 12. Top assembly 11 has a removable cover 51 attached to the heat exchanger top half 17 while the bottom assembly has a cover 16 attached to the heat exchanger lower half 18 with bolts 20. The heat exchanger upper half 17 and lower half 18 are machined from blocks of pure titanium so that when attached together with the O-ring seal 21 a liquid circuit for the passage of a cooling liquid is formed between the halves in which liquid only contacts pure titanium without solder or brazing. The lower half 18 has an inlet 22 and an outlet 25. The liquid is fed into the inlet along a channel 23 and between a plurality of ribs 24 in the bottom half to a channel 25 and out the outlet 23. The bottom half 18 has the channels 23 and 25 and the ribs 24 formed from one block of titanium in a position to coact with ribs formed in the upper half 17. The heat exchanger bottom half 18 has a plurality of pin fins 26 each of which may be made of copper and which may be attached to the surface 27 by brazing or soldering. The pins 26 are made of different metal than the titanium lower half 18 having a greater heat transfer effectiveness and may be coated with nickel to prevent corrosion of the copper. The titanium wall 28 and the lower half 18 having the ribs 24 is advantageously machined to be a very thin wall having the pin fins 26 attached directly to the other side thereof to increase the heat transfer through the wall, to the other side of the wall and to the pins 26. The thin walls may be between 0.020 and 0.060 inches. The thin wall is strengthened by the ribs 24 which also assist in providing channels for the flow of liquid to disperse the flow over the wall 28 for more even distribution. The lower cover 15 can be made of any material desired, and might typically be made of a metal such as aluminum, having more rapid disipation of heat from the heat exchanger unit. Air passes through the heat exchanger as illustrated by the arrow 30 because of the large number of pin fins aligned to give a maximum surface area. A higher air pressure drop is experienced, but one which is acceptable in the operation of the heat exchanger. The ribs 24, in addition to reinforcing the wall 28, also provides a larger surface area for the transfer for additional heat. The heat exchanger upper half 17 is similar to the bottom half 18, except that it does not require the inlet and outlet for the heat exchange coolant. It has a plurality of heat fins 30 brazed or soldered to one side of the titanium wall 31, while the other side of the wall 31 has ribs 32 similar to the ribs 24 of the bottom half. The ribs 32 form a plurality of channel and allow the bottom 31 to be made of a thin titanium surface. The top cover 15 can be seen in FIG. 2 having bolts 33 for bolting to the upper half 17.

Figure 3:
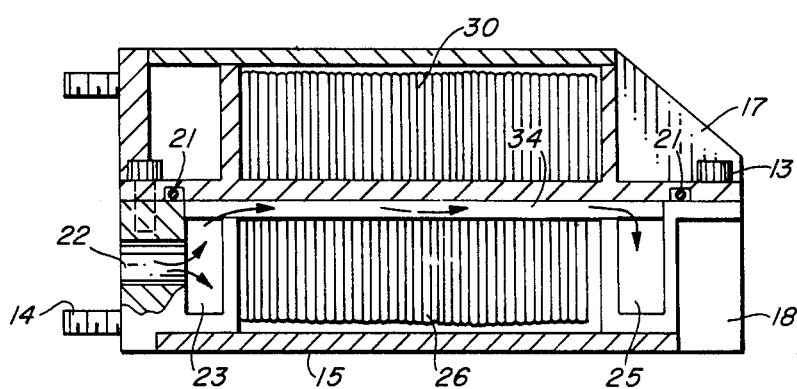
FIG. 3 is a side sectional view of the heat exchanger of FIGS. 1 and 2.
Figure 4:
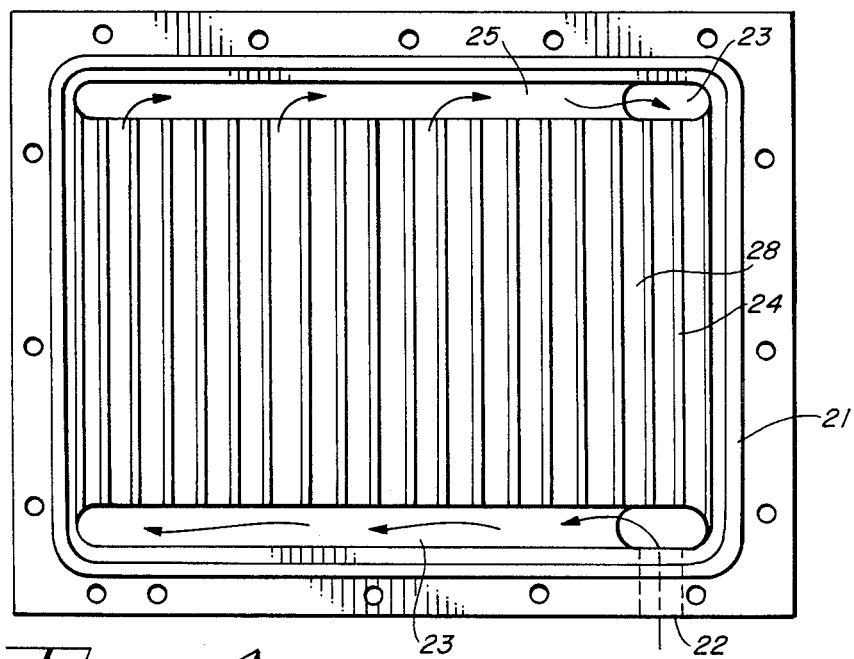
FIG. 4 is a top elevation view of the bottom half of the heat exchanger in FIGS. 1 through 3.
Figure 5:
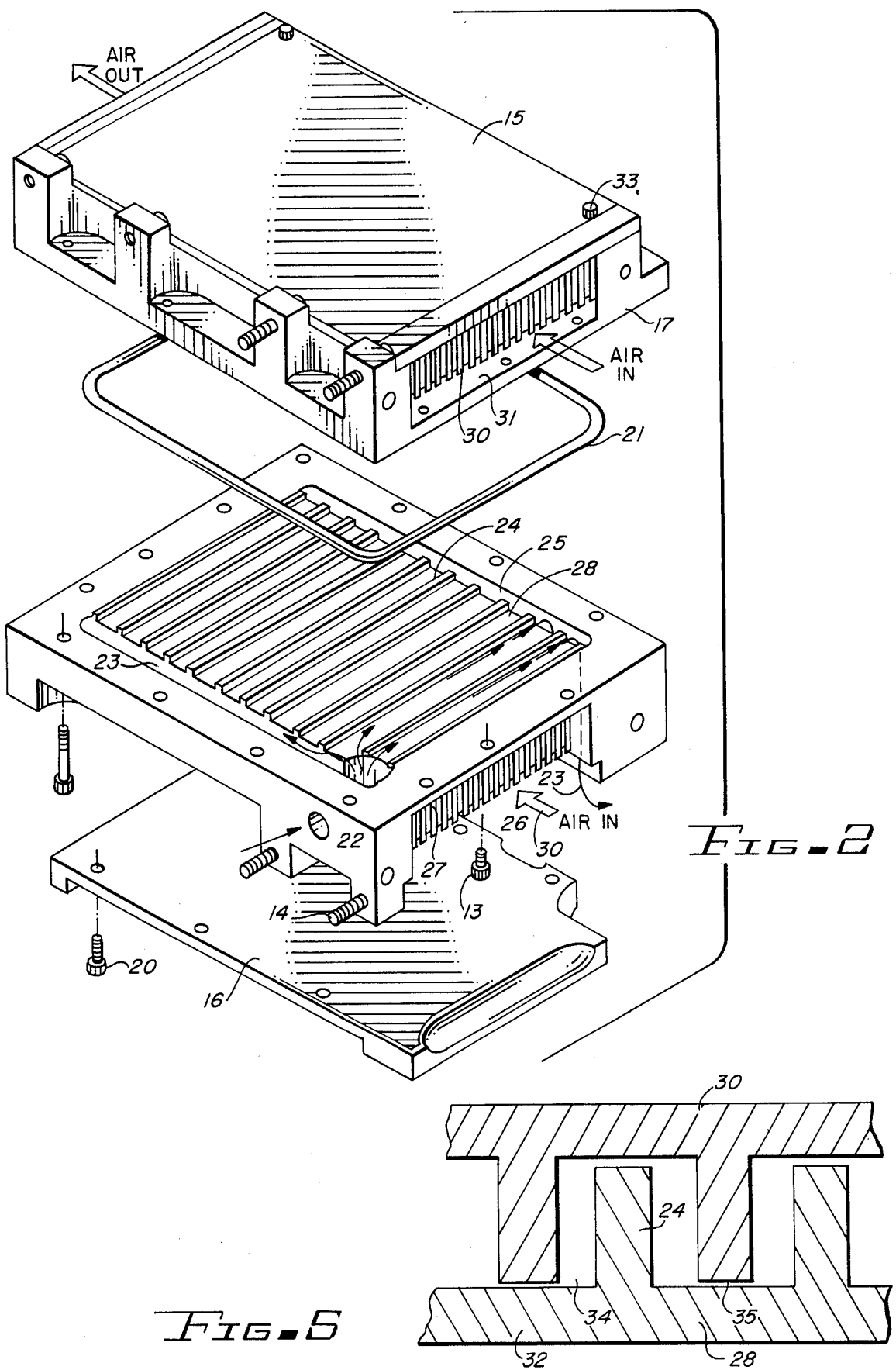
FIG. 5 is a broken away sectional view of the heat exchanger ribs connected to form the passage ducts.

In operation, the heat exchanger 10 may be attached to a laser or similar apparatus with the bolts 14, as seen in FIG. 3, so that a coolant liquid such as ethyleneglycol enters the inlet 22 into the channel 23 and follows the passageways formed by the ribs 24 and 32 to form a plurality of small channels 34, as seen in FIG. 5. The ribs 24 and 32, as seen in FIG. 5, allow a much larger surface area while reinforcing the thin titanium walls 28 and 30. Titanium walls 28 and 30 range in thickness between 0.020 and 0.060 inches and might typically be 0.030 inches. A slight spacing 35 between the ribs 32 and 24 and the walls 28 and 30 provides additional surface area, while at the same time forcing the liquid to spread out over the entire heat exchanger surface. After the liquid passes through the channels 34, it feeds into the plenum groove 25 and out the outlet 23. By machining the upper half 17 and lower half 18 of the heat exchanger from pure titanium, no soldering or brazing of the connections are required, and then by bolting the two halves together using a simple O-ring seal, ready access is provided to the liquid circuit of the heat exchanger. The use of pin fins, solder or brazing the material of a different material on the other side of thin walls of titanium also allows increased disipation of the heat from the cooling fluid, from the cooling fluid by the use of air passing through the air circuits on both sides of the liquid circuit. It should, of course, be clear that instead of a liquid/air heat exchanger, a fluid other than air can be utilized in the heat exchanger without departing from the spirit and scope of the invention. Accordingly, the present invention is not to be construed as limited to the forms shown, which are to be considered illustrative rather than restrictive. It is to be understood that titanium herein means any material which is substantially titanium in composition but which may have small amounts of other materials therein.

Figure 6:
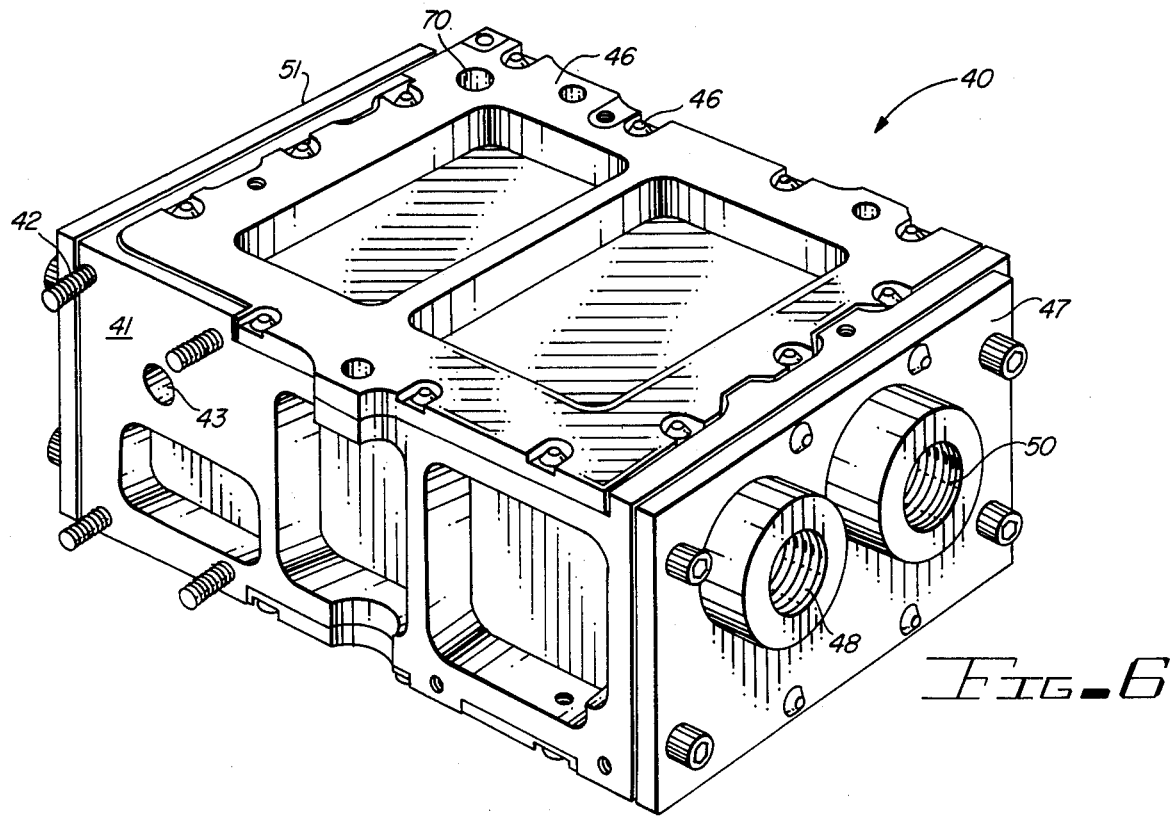
FIG. 6 is a top perspective view of a second embodiment of a heat exchanger in accordance with the present invention.
Figure 7:
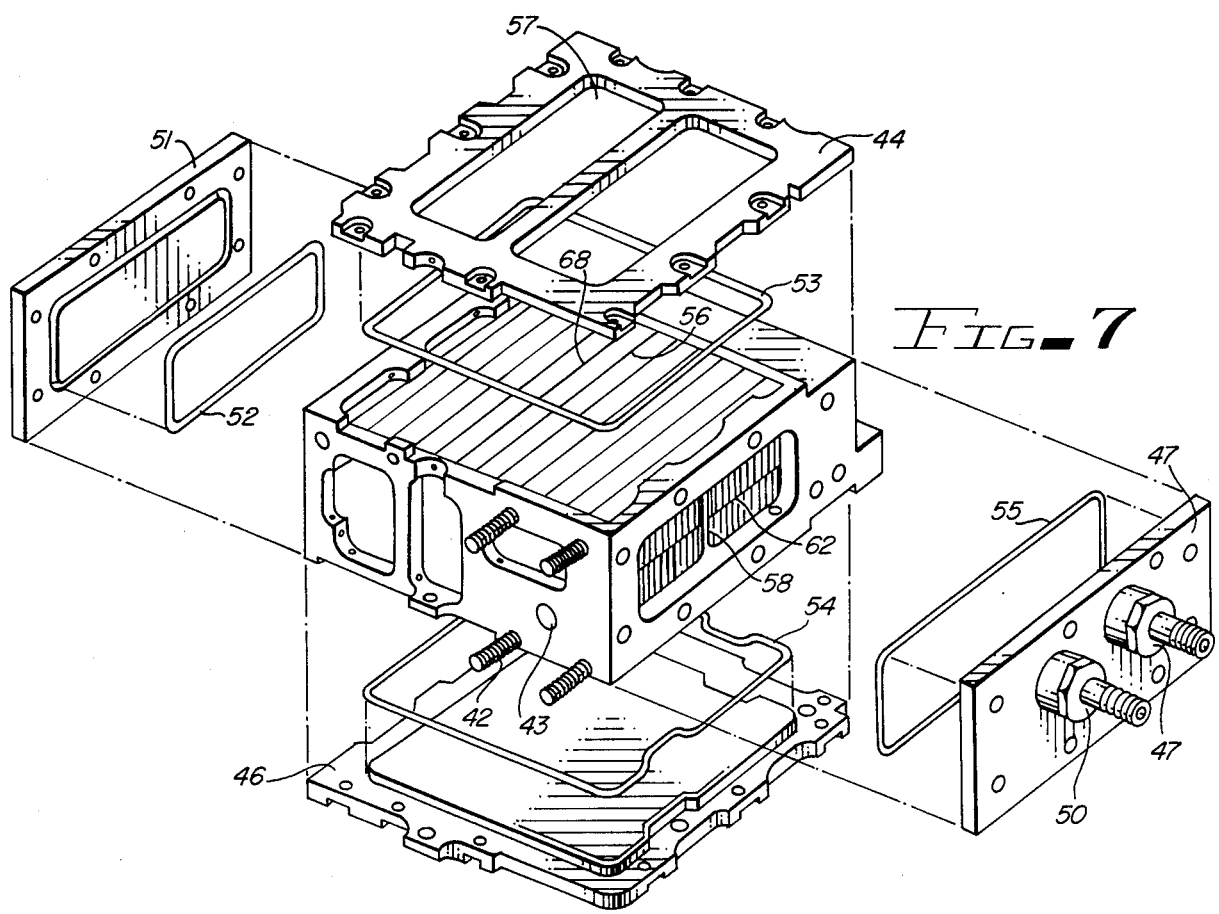
FIG. 7 is a bottom exploded view of the heat exchanger.

Turning now to FIGS. 6 through 9, a second embodiment of a heat exchanger 40 is shown assembled in FIG. 6 having a titanium housing 41 having attachment bolts 42 fixedly attached thereto for attaching to a device that the heat exchanger is to be used in connection with. An input opening 43 allows the entry of the fluid being cooled in the heat exchanger. A bottom cover 44 is mounted with bolts 45 to the titanium housing and the cover is also of titanium, as is the top cover 46. The front end plate 47 has a coolant input opening 48 and a coolant output opening 50. A rear end plate 51 is mounted to the other end of the end of the titanium housing 41 with a rear O-ring seal 52. The titanium bottom cover 44 is also mounted with an O-ring seal 54, and the bottom end plate has an O-ring seal 55. Front end plate 47 and rear end plate 51 are interchangable with each other. With the bottom cover 44 removed in FIG. 7, a plurality of ribs 56 directs fluids and channels similar to the plurality of ribs 24 in the embodiment of FIGS. 1 and 2. A second plurality of ribs identical to the ribs 56 is directly under the top cover 46. Bottom cover 44 has a sunken area 57 which allows the cover 44 to protrude into the titanium housing 41 adjacent the ribs 56. This embodiment has fin plates 58 rather than pin fins, which fin plates may be made of aluminum, copper, or silver and may be soldered or otherwise attached to the titanium cooling surface.

As more clearly shown in FIG. 8, the coolant enters a cooling line, passes through the fin plate mounted in a cooling channel 61 on one side of a dividing plate 62, through a second channel 63 filled with fin plates, and out the coolant output 48. The coolant is directed from the channel 61 around the dividing partition 62 into the channel 63 by the rear end plate 51 so that in this embodiment a liquid or gas coolant can be utilized and can be fed under pressure through the fin plates 58. A supporting arm 64 braces the titanium housing. The liquid being cooled is fed into the input 43, as is seen in FIG. 9, passes into a plenum area 65 on one side of the titanium housing 41 through a plurality of top channels 66 and a plurality of bottom channels 67 formed by the ribs 56, thus spreading the liquid out across the thin titanium wall 68 on the top and bottom dividing passageway 61 and 63 from the channels 66 and 67. The ribs 56 not only spread the liquid being cooled over the entire area of both cooling walls, but also given additional surface area to assist in the cooling. The thin titanium wall with a large number of fin plates 58 mounted directly thereto and having a forced liquid passing thereby provides an effective heat exchanger for removing large amounts of heat without the problems of cooling a coolant liquid such as ethylene-glycol when used in connection with annodized aluminum or other materials having a greater transfer of heat. The liquid being cooled as it passes through the channels 66 and 67 is passed into a plenum area 68 located on the other side of the housing 41 and out an output 70, where it is fed back to the instrument being cooled.

I claim:

1. A heat exchanger apparatus comprising in combination:
    a liquid circuit for the passage of a liquid to be cooled, said liquid circuit having a liquid input and a liquid output and said liquid circuit formed with titanium walls having ribs formed on at least one of said walls;
    a first fluid circuit for passage of a fluid for cooling a liquid passing through said liquid circuit and being attached adjacent to one said titanium wall of said liquid circuit, said first fluid circuit having a plurality of metallic cooling members made of a metal having a higher thermal conductivity than titanium fixedly attached to said one titanium wall; and a second fluid circuit for passage of a fluid for cooling a liquid passing through said liquid circuit and being attached adjacent to another said titanium wall of said liquid circuit, said second fluid circuit having a plurality of metallic cooling members made of a metal having a higher thermal conductivity than titanium fixedly attached to said other titanium wall, whereby a heat exchanger utilizes a titanium passageway to cool a heated liquid passing therethrough.

2. An apparatus in accordance with claim 1, in which said first and second fluid circuits plurality of metallic cooling members are metal pin fins.

3. An apparatus in accordance with claim 2, in which said metal pin fins are brazed to each titanium wall.

4. The apparatus in accordance with claim 3, in which said metal pin fins are copper pin fins.

5. The apparatus in accordance with claim 4, in which said copper pin fins are nickel plated.

6. The apparatus in accordance with claim 2, in which said metal pin fins are soldered to said titanium walls.

7. The apparatus in accordance with claim 1, in which said liquid circuit has coacting ribs formed on two walls, said ribs being elongated ribs protruding from each of two walls, each rib protruding between a pair of ribs on the opposite wall thereby forming a plurality of channels between the ribs through the heat exchanger.

8. The apparatus in accordance with claim 7, in which said liquid circuit for the passage of a liquid to be cooled is formed from each half, each half machined from a block of titanium with the halves bolted together.

9. The apparatus in accordance with claim 8, in which said liquid circuit machined titanium halves have an O-ring seal therebetween when bolted together.

10. The apparatus in accordance with claim 9, in which one said liquid circuit half has an input plenum for directing liquid to a plurality of channels formed by said elongated coacting ribs and an output plenum collecting liquid from said channels formed by said coacting ribs.

11. The apparatus in accordance with claim 1, in which said pair of titanium walls having coacting ribs formed thereon is a thin wall having a thickness between 0.020 and 0.040 inches.

12. A heat exchanger apparatus comprising in combination:

a titanium wall liquid passageway having an input and an output, a plurality of titanium walls, at least two of said titanium walls being between 0.020 and 0.040 inches thick and having a plurality of elongated titanium ribs formed thereon, each titanium wall's ribs coacting with the ribs on the other titanium wall by each rib on one wall protruding between pairs of ribs on the other wall; and a cooling fluid passageway adjacent at least one titanium wall of said titanium walled liquid passageway and having a plurality of metal cooling fins of higher thermal conductivity formed thereon and attached to one said titanium wall whereby a heat exchanger has a titanium passageway for a liquid to be cooled.

13. A heat exchanger apparatus in accordance with claim 12, in which said titanium liquid passageway is formed with upper and lower heat exchanger halves bolted together to form the titanium liquid passageway.

14. A heat exchanger apparatus in accordance with claim 13, in which said bolted together heat exchanger halves have an O-ring seal therebetween.

15. A heat exchanger apparatus in accordance with claim 14, in which each of said titanium halves are machined from one solid piece of titanium, whereby the liquid passageway has no brazed or soldered joints therein.

16. A heat exchanger apparatus in accordance with claim 15, in which said cooling fluid passageway has a plurality of metallic pin fins fixedly attached to at least one titanium wall of said heat exchanger on the opposite side of said wall from said liquid passageway.

17. A heat exchanger apparatus in accordance with claim 16, in which said cooling fluid passageway has said pin fins brazed to said titanium walls.

18. A heat exchanger apparatus in accordance with claim 17, in which said cooling fluid passageway pin fins are attached with solder to said titanium wall.

19. A heat exchanger apparatus in accordance with claim 18, in which there are a pair of fluid passageways each attached adjacent to one titanium wall of said titanium wall liquid passageway and each having a plurality of metal pin fins mounted to one titanium wall.

20. A heat exchanger apparatus comprising in combination:

a liquid circuit for the passage of a liquid to be cooled, said liquid circuit having a liquid input and a liquid output and being formed with titanium walls;

a fluid circuit for the passage of a fluid for cooling a liquid passing through said liquid circuit and being adjacent to at least one of said titanium wall of said liquid circuit, said liquid circuit having a plurality of metal cooling members fixedly made of a metal having a higher thermal conductivity than titanium attached to at least one said titanium wall, said fluid circuit having a fluid coolant input and a fluid coolant output therefrom; and attaching means for operatively attaching said heat exchanger apparatus to an apparatus being cooled by a liquid coolant, whereby a titanium heat exchanger is provided.

21. A heat exchanger apparatus in accordance with claim 20, in which said liquid circuit for the passage of a liquid to be cooled has two passageways from said input to said output of said liquid circuit, each passageway having a plurality of elongated ribs formed therein to spread liquid to be cooled over a pair of thin titanium walls.

22. A heat exchanger apparatus in accordance with claim 21, in which said pair of thin titanium walls having ribs formed thereon each have a thickness between 0.020 and 0.040 inches.

23. A heat exchanger apparatus in accordance with claim 22, which each of said pair of thin titanium walls has a plurality of metal cooling members fixedly attached thereto.

24. A heat exchanger apparatus in accordance with claim 23, in which said plurality of metal cooling members are fixedly attached to said thin titanium walls with metal solder.

25. A heat exchanger apparatus in accordance with claim 23, in which said plurality of metal cooling members are metal fin plates attached to each thin titanium wall.

26. A heat exchanger apparatus in accordance with claim 25, in which said metal fin plates are formed from thin sheets of a metal folded in a serpentine fashion attached to said thin titanium walls.

27. A heat exchanger apparatus in accordance with claim 22, in which said liquid circuit for the passage of a liquid to be cooled is formed by said pair of thin titanium walls having a titanium cover plate attached thereover and having seals therearound on the opposite side of said thin titanium walls from said fluid circuit for the passage of fluid.

28. A heat exchanger apparatus in accordance with claim 27, in which said fluid circuit for the passage of a fluid has a first end plate having an input and output therein covering the input and output to said fluid circuit and a second end plate attached to said heat exchanger apparatus for directing said coolant from said first passageway to said second passageway.

29. A heat exchanger apparatus in accordance with claim 28, in which said fluid circuit is a liquid circuit for a cooling liquid having ethylene-glycol therein.

30. A heat exchanger apparatus in accordance with claim 28, in which said fluid circuit for the passage of fluid is sealed to supply a coolant under pressure therethrough.

31. A heat exchanger apparatus in accordance with claim 20, in which said liquid fluid circuit for the passage of fluid has a fluid input into a passageway adjacent one said thin titanium wall through a plurality of said metal cooling members and from said first passageway to a second passageway adjacent said second thin titanium wall through a second plurality of metal cooling members, said fluid passing out a fluid output from said fluid circuit.

* * * * *